(12) United States Patent
Soliman

(10) Patent No.: US 6,321,090 B1
(45) Date of Patent: Nov. 20, 2001

(54) MOBILE COMMUNICATION SYSTEM WITH POSITION DETECTION TO FACILITATE HARD HANDOFF

(76) Inventor: Samir S. Soliman, 11412 Cypress Canyon Park Dr., San Diego, CA (US) 92131

( * ) Notice: Subject to any disclaimer, the term of this patent is extended or adjusted under 35 U.S.C. 154(b) by 0 days.

(21) Appl. No.: 09/187,939

(22) Filed: Nov. 6, 1998

(51) Int. Cl.[7] .................................................. H04Q 7/38
(52) U.S. Cl. .................. 455/440; 455/436; 455/439; 455/456; 370/331
(58) Field of Search .................................. 455/440, 436, 455/439, 456, 457; 342/357.06, 357.09, 357.1, 457; 370/331, 335, 342

(56) References Cited

U.S. PATENT DOCUMENTS

| | | | |
|---|---|---|---|
| 5,546,445 | * 8/1996 | Dennison et al. | 455/440 |
| 5,669,061 | 9/1997 | Schipper . | |
| 5,680,395 | * 10/1997 | Weaver et al. | 370/331 |
| 6,064,336 | * 5/2000 | Krasner | 342/357.05 |

FOREIGN PATENT DOCUMENTS 9916276   4/1999   (WO) .

* cited by examiner

Primary Examiner—Lee Nguyen
(74) Attorney, Agent, or Firm—Philip R. Wadsworth; Charles D. Brown; Bruce W. Greenhaus

(57) ABSTRACT

A system for facilitating handoff adapted for use with a telecommunications network. The system includes position equipment for determining the location of a mobile transceiver within a region containing a first cell and a second cell. A comparison circuit compares the location with a predetermined handoff area within the region and provides a control signal in response thereto. A handoff initiation circuit initiates handoff of the mobile transceiver between the first cell and the second cell in response to the control signal. In a specific embodiment, the handoff is a hard handoff. The position equipment includes Global Positioning System (GPS) equipment including a mobile unit GPS receiver and signal interface. The comparison circuit includes a positional database that stores latitudinal and longitudinal information corresponding to the predetermined handoff area. The comparison circuit also includes a Code Division Multiple Access selector. The selector begins tracking the position of the mobile transceiver when it is within a predetermined range of the predetermined handoff area. In a specific embodiment, the handoff initiation circuit includes a base station controller. The position equipment includes a base station positional detection system and a mobile unit positional detection system for determining the location of the mobile transceiver. The position database has map information depicting the coverage area of the first and second cells and the predetermined handoff area. The selector runs software for comparing the location to the map information and providing the control signal when the location is within the predetermined handoff area. The base station includes and implements instructions for completing hard handoff in response to the control signal.

5 Claims, 14 Drawing Sheets

FIG. 4: SUCCESSFUL IS-95 TO IS-95 HARD HANDOFF

FIG. 5: SUCCESSFUL IS-95 TO ANSI/EIA/TIA.553 HARD HANDOFF

MOBILE COMMUNICATION SYSTEM WITH POSITION DETECTION TO FACILITATE HARD HANDOFF

BACKGROUND OF THE INVENTION

1. Field of Invention

This invention relates to communications systems. Specifically, the present invention relates to systems and methods for facilitating handoff in telecommunications systems.

2. Description of the Related Art

Cellular telecommunications systems are characterized by a plurality of mobile units (e.g. cellular telephones) in communication with one or more base stations. Signals transmitted by the mobile units are received by a base station and often relayed to a mobile switching center (MSC). The MSC in turn routes the signal to a public switched telephone network (PSTN) or to another mobile station. Similarly, a signal may be transmitted from the public switched telephone network to a mobile unit via a base station and a mobile switching center.

Each base station covers a 'cell' within which a mobile unit may communicate. A cell covers a limited geographic area and routes calls from mobile units to and from a telecommunications network via a mobile switching center. The coverage area of a typical cellular telecommunications system is divided into several cells. Different communications resources such as frequencies are often allocated to each cell to maximize communications system resources. When a mobile unit moves from a first cell to a second cell, a handoff is performed to assign new system resources associated with the second cell.

A handoff involves the execution of a set of negotiation instructions between the mobile unit and one or more governing base stations and/or mobile switching centers. Cellular telecommunications systems generally require timely handoff procedures to maximize the utilization of system resources. Efficient and timely handoff procedures are becoming increasingly important as smaller cells are deployed to meet demands for increased communications system capacity. Use of the smaller cells increases the number of cell boundary crossings and frequency assignments thereby increasing the need for efficient and cost-effective handoff triggering mechanisms.

Timely handoff mechanisms are particularly important for systems employing 'hard handoff' procedures. Hard handoff procedures are used to transfer an ongoing call between adjacent cells, different frequency assignments and/or different frame offsets, or to direct a mobile station from a code division multiple access (CDMA) forward traffic channel to an analog voice channel. In a hard handoff, the first link with the first cell is broken and then second link is established. (In a 'soft handoff', the first link is maintained until the second link is established and there is a time during which the first link and second link are maintained simultaneously.) In the case of hard handoff a large delay between the dropping of the first link and the establishment of the second link may result in unacceptable communications system service quality.

To enhance telecommunications system capacity and service quality, multi-layer systems with macrocells overlaying microcells are often employed. Clever uses of the layers can lead to increased end-user performance and system capacity. For example, stationary users can be assigned to microcells so that they operate at reduced power and cause significantly less interference. When the microcellular capacity is exhausted, overflow traffic is assigned to the macrocells. Typically, the microcells will have more frequency assignments than the macrocells. Hard handoff is implemented when a mobile unit crosses between the two layers in the multi-layer system.

To facilitate hard handoff between adjacent cells, a handoff beacon is often employed. A beacon in each cell broadcasts a signal having a limited range about the cell. When a mobile unit in a first cell detects a beacon from a second cell, the telephone is handed off to the second cell. Unfortunately, the beacon mechanism makes inefficient use of system resources. The frequency band allocated for such beacons does not currently support traffic such as voice calls. In addition, the beacons may require additional expensive broadcasting hardware. These limitations often limit the coverage and capacity of telecommunications system cells.

Alternatively, a transition cell may be implemented between two cells. The transition cell overlaps the two cells and maintains a special pilot offset signal detectable by a mobile unit. When the mobile unit detects the pilot offset, hard handoff is triggered. The transition cell must substantially overlap the first and second cells. The overlap represents inefficient and redundant use of system resources. In addition, the transition cell doesn't support system traffic.

Hence, a need exists in the art for a fast, efficient and cost-effective system for triggering hard handoff in a cellular telecommunications system.

SUMMARY OF THE INVENTION

The need in the art is addressed by the communications system of the present invention. Generally, the system includes a first transceiver disposed to provide a first coverage area, a second transceiver disposed to provide a second coverage area, and a mobile transceiver adapted to communicate with the first transceiver. A particularly novel aspect of the invention is the provision of a mechanism for establishing a communications link between the mobile transceiver and the second transceiver based on the position of the mobile transceiver relative to the first or the second coverage area.

In the illustrative embodiment, the system includes a mechanism for determining the location of a mobile transceiver within a region containing a first cell and a second cell. A comparison circuit compares the location with a predetermined handoff area within the region and provides a control signal in response thereto. A handoff initiation circuit initiates handoff of the mobile transceiver between the first cell and the second cell in response to the control signal.

In an illustrative embodiment, the handoff is a hard handoff. The position equipment includes Global Positioning System (GPS) equipment. The GPS equipment includes a GPS receiver and signal interface disposed at a mobile unit and a GPS receiver and computer at a base station associated with the first cell and/or the second cell. In a specific implementation, the computer is programmed to locate a set of optimal GPS satellites for use by the mobile unit. The computer further includes instructions for approximating a distance between the mobile station and the base station based on signal travel time between the base station and the mobile unit.

The comparison circuit is implemented with a positional database that stores latitudinal and longitudinal information corresponding to a predetermined handoff area. The comparison circuit also includes a Code Division Multiple Access selector. The selector begins tracking the position of the mobile transceiver when it is within a predetermined range of the predetermined handoff area and provides a tracking signal in response thereto.

The handoff initiation circuit includes a first circuit for implementing handoff of the mobile station from the first cell to the second cell when the mobile station moves from within the first cell into the predetermined handoff area as determined by the handoff initiation circuit via the tracking signal from the selector. The handoff initiation circuit further includes a second circuit for implementing handoff of the mobile station from the second cell to the first cell when the mobile station moves from the second cell to the predetermined handoff area as determined by the handoff initiation circuit using the tracking signal.

In the specific embodiment, pilot offsets transmitted via the first or second cell and received by the mobile station initiate tracking of the mobile station by the selector; the selector then provides the tracking signal. The tracking signal is the control signal when the mobile station is within the predetermined handoff area.

In the illustrative embodiment, the handoff initiation circuit includes a selector bank subsystem running on a mobile switching center. The position equipment includes a base station positional detection system and a mobile station positional detection system for determining the location of the mobile station. The comparison circuit includes the selector bank subsystem, which is in communication with a position database. The position database has map information depicting the coverage area of the first and second cells and the predetermined handoff area. The selector bank subsystem runs software that continuously compares the location to the map information and provides the control signal when the location is within the predetermined handoff area. The base station implements instructions for completing hard handoff in response to the control signal.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
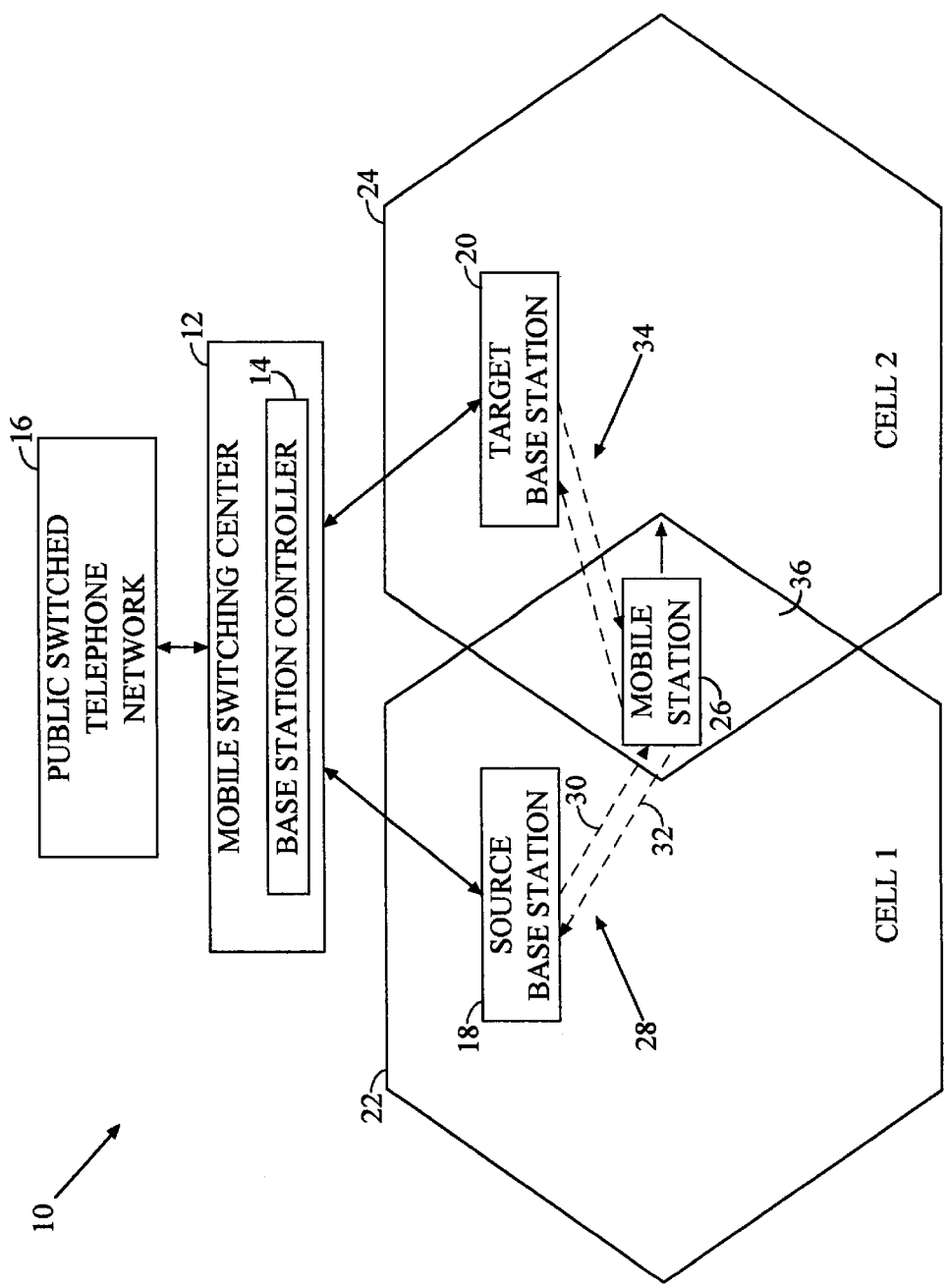
FIG. 1 is a block diagram of an exemplary CDMA cellular telephone system.

FIG. 1 is a block diagram of an exemplary CDMA cellular telephone system 10. The system 10 includes a mobile switching center (MSC) 12 having a base station controller (BSC) 14. A public switched telephone network (PSTN) 16 routes calls from telephone lines and other networks (not shown) to and from the MSC 12. The MSC 12 routes calls from the PSTN 16 to and from a source base station 18 and a target base station 20 associated with a first cell 22 and a second cell 24, respectively. In addition, the MSC 12 routes calls between the base stations 18 and 20. The source base station 18 directs calls to the first mobile unit 26 within the first cell 22 via a first communications link 28. The communications link 28 is a two-way link having a forward link 30 and a reverse link 32. Typically, when the base station 18 has established voice communications with the mobile unit 26, the link 28 is characterized as a traffic channel. Although each base station 18 and 20 is associated with only one cell, a base station often governs or is associated with several cells.

When the mobile unit 26 moves from the first cell 22 to the second cell 24, the mobile unit 26 is handed off to the target base station 20. Handoff typically occurs in an overlap region 36 where the first cell 22 overlaps the second cell 24.

In a soft handoff, the mobile unit 26 establishes a second communications link 34 with the target base station 20 in addition to the first communications link 28 with the source base station 18. After the mobile unit 26 has crossed into the second cell 24, it may drop the first communications link 28.

In a hard handoff, the communications link 34 is not established. When the mobile unit 26 moves from the first cell 22 to the second cell 24, the link 28 to the source base station 18 is dropped and a new link is formed with the target base station 20.

The present invention accommodates several types of hard handoff including intersystem hard handoff and intrasystem hard handoff. An intersystem hard handoff occurs when a mobile unit operating under the control of a given cellular telecommunications system, such as the system 10, moves outside the coverage area of the telecommunications system and is handed off to an adjacent system (not shown). Intersystem hard handoff is used when two telecommunications systems are adjacent to one another and the neighboring system is better able to serve the mobile unit 26 than the current serving system 10. The neighboring system and the serving system 10 must have contiguous serving areas.

Intersystem handoff can take place between two systems using the same air interface or between two systems using two different air interfaces.

Intrasystem hard handoff is employed in systems having multiple frequencies assigned to some base stations to efficiently utilize spectrum resources and increase the capacity of the CDMA network. Using multiple frequencies often provides advantages over other methods aimed at capacity increase such as cell splitting or cell sectorization. Intrasystem handoff can also happen between two networks of the same system using two different air interfaces.

In multiple frequency systems, hard handoff is required when a mobile is moving from an area that has multiple frequencies to an area that has fewer frequencies. Hard handoff is also required when a mobile unit is moving from an area with small load on the serving frequency to an area with high load on the serving frequency and load balancing is required.

Figure 2:
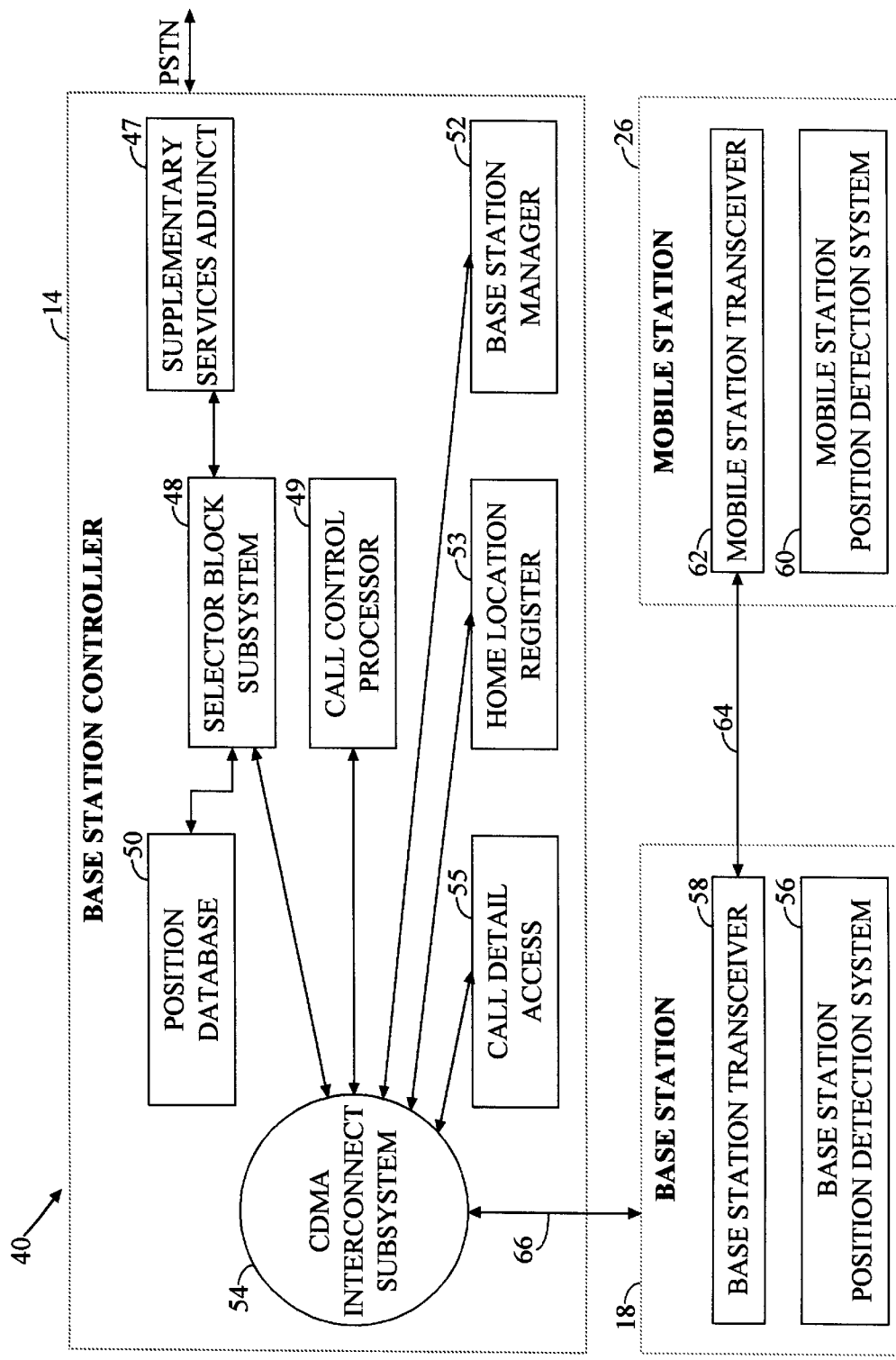
FIG. 2 is a block diagram of a system for facilitating hard handoff constructed in accordance with the teachings of the present invention.

FIG. 2 is a block diagram of a system 40 for facilitating hard handoff constructed in accordance with the teachings of the present invention. In the present specific embodiment, the system 40 is adapted for use with a CDMA telecommunications system that includes a base station controller 14, a base station 18 and a mobile unit 26. The base station controller 14 includes a selector, i.e., selector bank subsystem 48 in communication with a position database 50 and a CDMA interconnect subsystem 54. The system 40 further includes a base station positional detection system 56 in communication with a base station transceiver 58, both in the base station 18. The system 40 further includes a mobile station positional detection system 60 in communication with a mobile station transceiver 62, both in the mobile unit 26.

The base station positional detection system 56 includes Global Positioning System (GPS) equipment, as discussed more fully below, to facilitate locating the position of the mobile unit 26 via the mobile station positional detection system 60, and GPS satellites. In the present specific embodiment and as discussed more fully below, the mobile station positional detection system 60 includes a GPS receiver and an associated computer interface.

Those skilled in the art will appreciate that other types of position detection technology, i.e., location technology may be used in addition to or instead of GPS location technology for the purposes of the present invention without departing from the scope thereof.

In the best mode, the base station positional detection system 56 computes the distance of the mobile unit 26 from the base station 18 based on signal travel time over an Air-Interface link 64. Information regarding the most optimal GPS satellites in view of the mobile unit 26 is relayed by the base station positional detection system 56 to the mobile unit 26 over the Air-Interface link 64. This information is used by the mobile unit 26 to facilitate location of the GPS satellites which, in turn, provide distance information to the mobile unit 26 or base station 18 corresponding to the distance from the GPS satellites to the mobile unit 26. By utilizing the distance between the base station 18 and the mobile unit 26, the base station positional detection system 56 obviates the need for the mobile unit positional detection system 60 to locate an additional satellite.

Those skilled in the art will appreciate that only two GPS satellites and information with respect to the distance between the mobile unit 26 and the base station 18 are required to accurately fix the position of the mobile unit 26 in two dimensions.

After the position of the mobile unit 26 is fixed via the base station positional detection system 56 and the mobile unit positional detection system 60, the position information is relayed to the base station controller 14 via an A-Interface link 66. The position information is received by the CDMA interconnect subsystem 54 and routed to the selector bank subsystem 48. The selector bank subsystem 48 runs software that starts monitoring the position of the mobile unit 26 when the mobile unit 26 identifies pilot signals corresponding to a region near a handoff region and relays this pilot identification information to the base station controller 14 by way of the base station 18.

The position database 50 stores mapping information of the telecommunications system coverage area and maintains the location of hard handoff regions. When the mobile unit 26 enters a hard handoff region as determined by the selector bank subsystem 48 via the position database 50, the selector bank subsystem 48 initiates hard handoff procedures by issuing appropriate commands to the CDMA interconnect subsystem 54 and/or to a supplementary services adjunct 47. The supplementary services adjunct 47 is connected to a call control processor 49 that is in communication with the CDMA interconnect subsystem 54. The call control processor 49 and the supplementary services adjunct 47 facilitate the routing of calls between the base station controller 14 and a PSTN. The construction of the supplementary services adjunct 47 and call control processor 49 is known in the art. The supplementary services adjunct 47 may be replaced with a standard mobile switch without departing from the scope of the present invention.

The commands required to initiate hard handoff procedures are well known in the art. Hard handoff procedures hand off the mobile unit 26 to the coverage area of a new cell, or to a new frequency, or from a CDMA system to an analog system, or to new pilot offsets. The selector bank subsystem 48, the CDMA interconnect subsystem 54, and the base station controller 14 are known in the art.

In addition, software running on the selector bank subsystem 48 for comparing the current position of the mobile unit 26 to predetermined handoff regions in the positional database 50 is easily developed and employed by those ordinarily skilled in the art.

The software running on the selector bank 48 monitors the position of the mobile unit 26 via position information received from the base station 18 or the mobile unit 26 and determines when handoff is required via a comparison of the received position information with position information stored in the position database 50.

For illustrative purposes, a call detail access 55, a home location register, and a base station manager 52 are shown connected to the CDMA interconnect subsystem 54 in the base station controller 14. The call detail access 55 facilitates keeping billing records for each mobile unit user. The home location register 53 maintains information about each user and what services they are subscribed to. The base station manager 52 monitors the overall operational health of the system 14. Those skilled in the art will appreciate that the supplementary services adjunct 47, the call control processor 49, the call detail access 55, the home location register 53, and the base station manager 52 may be omitted from the system 40 or replaced with other circuits without departing from the scope of the present invention.

Once the base station position detection system 56 or the mobile station position detection system 62 detects that the mobile unit 26 is in a transition region and is about to be handed off, the associated target cell (see 24 of FIG. 1) needs to be identified. The identification of the particular cell or sector receiving the hard handoff is derived from the position database 50 connected to the selector bank subsystem 48. A one-to-one correspondence exists between the position location reported by the position detection system (56 and/or 60) and the target cell or sector to be identified in a hard handoff directive message to the neighboring system or target cell. This information is considered as static configuration information that is stored in the position database 50. The database 50 may be updated on a regular basis or on an as-needed basis.

Figure 3:
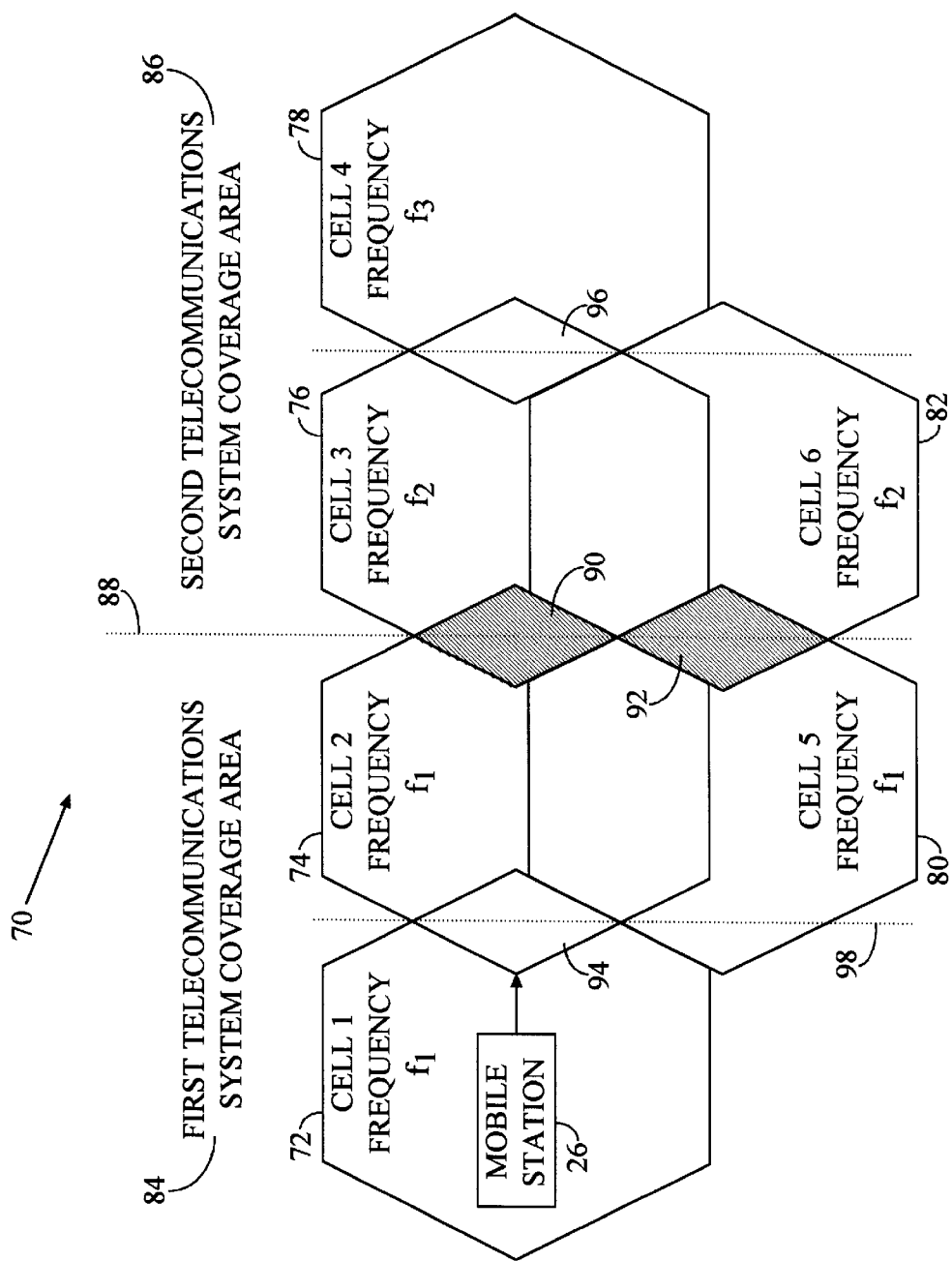
FIG. 3 is a diagram of a telecommunications coverage area illustrating exemplary scenarios wherein the system of FIG. 2 implements hard handoff.

FIG. 3 is a diagram of a telecommunications coverage area 70 illustrating exemplary scenarios wherein the system 40 of FIG. 2 implements hard handoff. The coverage area 70 includes from left to right, a first cell 72, a second cell 74, a third cell 76, and a fourth cell 78. Below the second 74 and third 76 cells are fifth 80 and sixth 82 cells, respectively. The mobile unit 26 is shown in the first cell 72 en route to the other cells 74, 76, 78, 80, 82.

The first cell 72, the second cell 74, and the fifth cell 80 are part of a first telecommunication system coverage area 84 and utilize a first frequency $f_1$ for traffic channel communications. The third cell 76, the fourth cell 78, and sixth cells 82 are part of a second telecommunication system coverage area 86. The third and sixth cells 76 and 82, respectively, utilize a second frequency $f_2$ for traffic channel communications, while the fourth cell 78 utilizes a third frequency $f_3$ for traffic channel communications.

The second cell 74 and the fifth cell 80 overlap the third cell 76 and sixth cell 82, respectively, at a border 88 between the first coverage area 84 and the second coverage area. Overlap between the second 74 and third 76 cells form a first handoff region 90, and overlap between the fifth 80 and sixth 82 cells form a second handoff region 92 next to the first handoff region 90. Third and fourth handoff regions 94 and 96, occur in overlapping areas between the first and second cells 72 and 74, and the third and fourth cells 76 and 78, respectively.

When the mobile unit 26 moves from the first cell 72 to the second cell 74 across a first boundary 98, it detects pilot signals corresponding to the second cell 74. With reference to FIG. 2, when the mobile unit 26 detects the pilot signals, the selector 48 is activated by way of the Air-Interface link 64 and the A-Interface link 66. The selector 48 begins tracking the position of the mobile unit 26 with the aid of the mobile unit positional detection system 60 and the base station positional detection system 56. Once the mobile unit 26 enters the first or second handoff regions 90 or 92, respectively, the selector 48 initiates hard handoff via the base station controller 14.

When the telecommunications systems corresponding to the first and second coverage areas 84 and 86, respectively, are CDMA systems, the mobile unit 26 is handed off from the first CDMA frequency assignment $f_1$ to the second CDMA frequency assignment $f_2$. The base station controller 14 corresponding to the first coverage area 84 must transfer the mobile unit 26 to a different base station controller (not shown) corresponding to the second coverage area 86. Procedures for performing handoff between mobile switching centers are well known in the art.

The active signal set is the set of signals that contains all of the pilot signals that the mobile unit 26 is currently or potentially demodulating. If the active signal set used by the phone 26 contains pilot offsets corresponding to the second or fifth cell 74 or 80, respectively, or both, the selector 48 will start tracking the mobile unit 26 and initiate hard handoff when mobile unit 26 enters the first or second handoff regions 90 or 92, respectively. The base station controller 14 includes instructions for completing handoff to a new mobile switching center coverage area which are initiated by the selector 48 in response to the mobile unit 26 being in the first or second handoff regions 90 or 92, respectively. The mobile unit 26 could simultaneously be in soft handoff with first and fifth cells 72 and 80, respectively.

Figure 4:
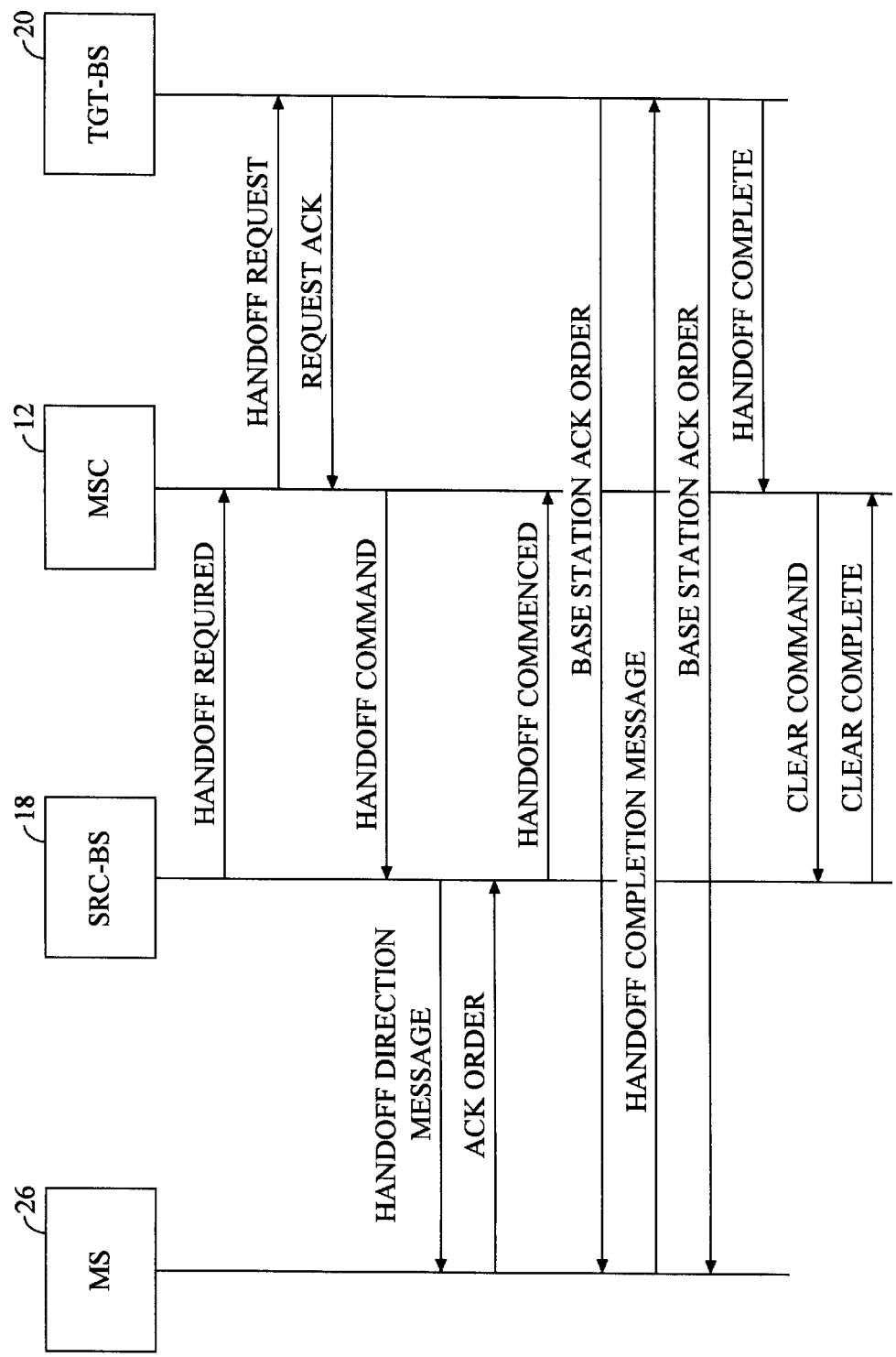
FIG. 4 is a diagram illustrating service negotiation procedures for completing hard handoff between two IS-95 cellular telecommunications systems.

When the first and second coverage areas 84 and 86, respectively, are governed by the same CDMA system, the mobile unit 26 is handed off from the first CDMA frequency assignment $f_1$ to the second CDMA frequency assignment $f_2$. The base station 18, in response to handoff initiation via the selector 48 and base station controller 14, directs the mobile unit 26 to perform a CDMA-to-CDMA hard handoff by sending an Extended Handoff Direction Message or a Handoff Direction Message to the mobile unit 26 in accordance with Chapter 7 of the telecommunications standard IS-95A and as shown in FIG. 4. These messages are designed to facilitate the transition of the mobile unit 26 between disjoint sets of base stations, different frequency assignments, or different frame offsets.

At an action time specified in the Extended Handoff Direction Message or the Handoff Direction Message, the mobile unit 26 disables its transmitter, resets its fade timer, suspends supervising the traffic channel, and tunes to the assigned forward traffic channel. The mobile unit 26 then acquires pilots in the new active set. Upon verifying mobile unit acquisition of the traffic channel, the mobile unit 26 resumes transmitting on the new channel.

Figure 5:
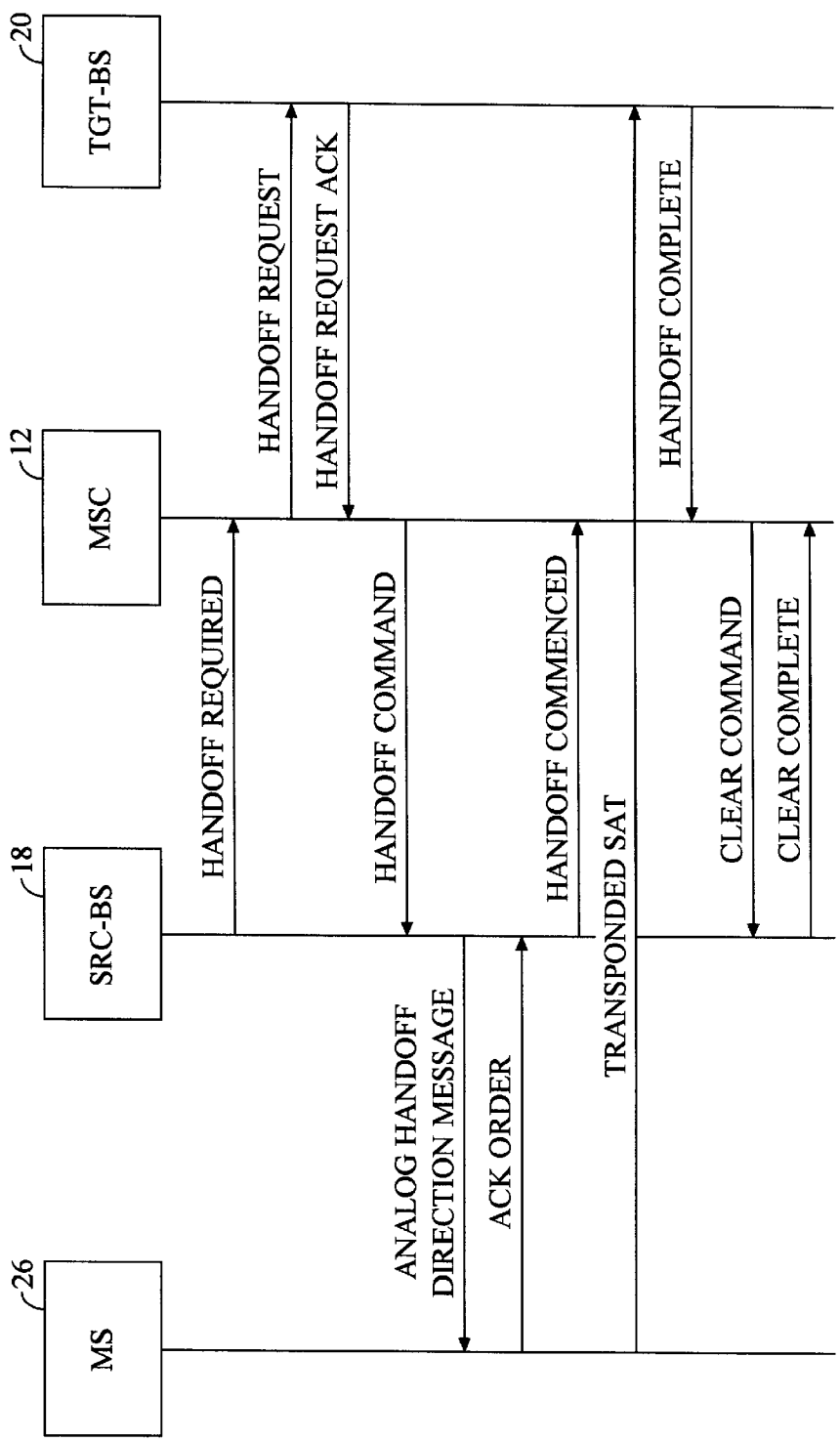
FIG. 5 is a diagram illustrating service negotiation procedures for completing hard handoff between an IS95 cellular telecommunications system and an ANSI/EIA/TIA.553 cellular telecommunications system.

When the telecommunications systems corresponding to the first and second coverage areas 84 and 86, respectively, are CDMA and analog systems, respectively, the mobile unit 26 is handed off from the first CDMA frequency assignment $f_1$ to the second analog frequency assignment $f_2$. The base station 18, in response to handoff initiation via the selector bank subsystem 48 and base station controller 14, directs the mobile unit 26 to perform a CDMA-to-analog handoff by sending an Analog Handoff Direction Message. If the mobile unit 26 has a narrow analog capability, the base station 44 may direct the handoff to a narrow analog channel. The mobile unit 26 follows the steps given in Chapter 6 of the telecommunications standard IS-95A to perform the hard handoff and as shown in FIG. 5.

The position database 50 maintains information corresponding to the locations of the current hard handoff regions 90, 92, 94, and 96. Table 1 below is a sample position database table. The accuracy and resolution of positional information in Table 1 depend on the accuracy of the position location technology used. Table 1 can be constructed based on data collected in the field. Information in Table 1 may be updated on a regular basis using data collected by telecommunications service provider personnel or collected by regular services such as taxi cabs, mail carriers such as United Parcel Service (UPS), and/or delivery services such as pizza or flower delivering businesses.

TABLE 1

Hard Handoff Regions

| Latitude | | | Longitude | | | System 1 | System 2 | Type |
|---|---|---|---|---|---|---|---|---|
| 32 | 25 | 10 | −117 | 10 | 12 | 3555 | 6555 | CDMA-Analog |
| 32 | 25 | 12 | −117 | 10 | 12 | 3555 | 6555 | CDMA-Analog |
| 32 | 25 | 14 | −117 | 10 | 12 | 3555 | 6555 | CDMA-Analog |
| 32 | 25 | 10 | −117 | 10 | 14 | 3555 | 6555 | CDMA-Analog |

TABLE 1-continued

Hard Handoff Regions

| Latitude | | | Longitude | | | System 1 | System 2 | Type |
|---|---|---|---|---|---|---|---|---|
| 32 | 25 | 12 | -117 | 10 | 14 | 3555 | 6555 | CDMA-Analog |
| 32 | 25 | 14 | -117 | 10 | 12 | 3555 | 6555 | CDMA-Analog |

Numbers in the System 1 and System 2 columns represent system identification (SID) numbers. The Type column describes the type of handoff required in the associated handoff regions whose locations are detailed in the Latitude column and the Longitude column.

The following discussions are intended to facilitate an understanding of the preferred position detection technology used by the system 40 of FIG. 2. Those skilled in the art will appreciate that other position detection technologies may be used without departing from the scope of the present invention.

Figure 6:
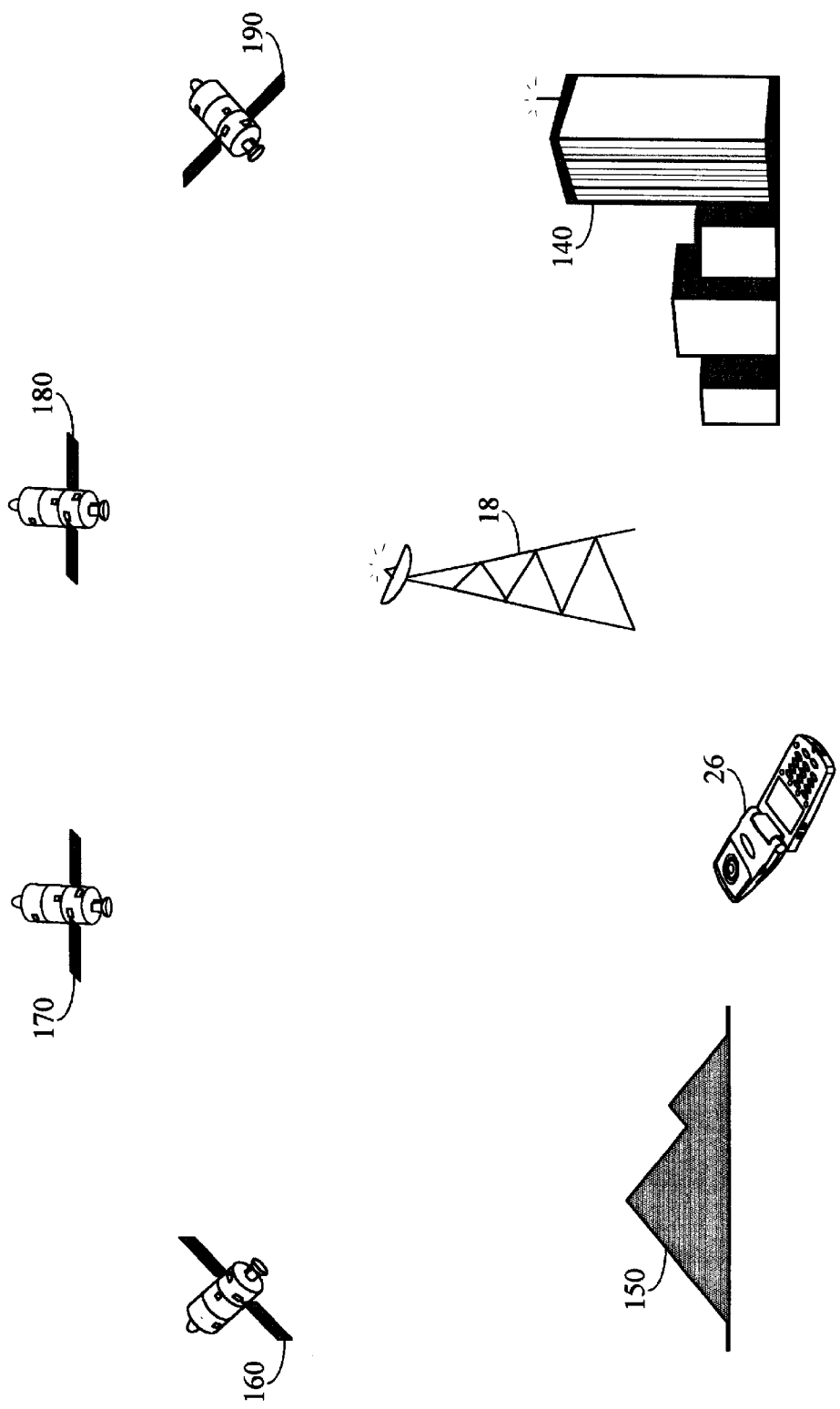
FIG. 6 is a diagram showing an illustrative implementation of a base station and a wireless unit of a wireless (CDMA) communication system.

FIG. 6 is a diagram showing an illustrative implementation of a base station 18 and a wireless unit 26 of a wireless (CDMA) communication system. The communication system is surrounded by buildings 140 and ground based obstacles 150. The base station 18 and wireless unit 26 are disposed in a GPS (Global Positioning System) environment having several GPS satellites, of which four are shown 160, 170, 180 and 190. Such GPS environments are well known. See for example Hofmann-Wellenhof, B., et al., GPS Theory and Practice, Second Edition, New York, N.Y.: Springer-Verlag Wien, 1993. Those of ordinary skin in the art will appreciate that the present teachings may be applied to other communication systems, such as Global System for Mobile Communications (GSM), without departing from the scope of the present invention.

In a typical GPS application, at least four satellites are required in order for a GPS receiver to determine its position. In contrast, the present invention provides a method and apparatus for determining the position of a wireless unit 26 using only three GPS satellites and the round trip delay from the wireless unit 26 to the serving base station 18. In cases where there is a direct line-of-sight to the base station 18, only two GPS satellites, round trip delay, and the known location of the serving base station 18 are required to locate a wireless unit 26.

Figure 7:
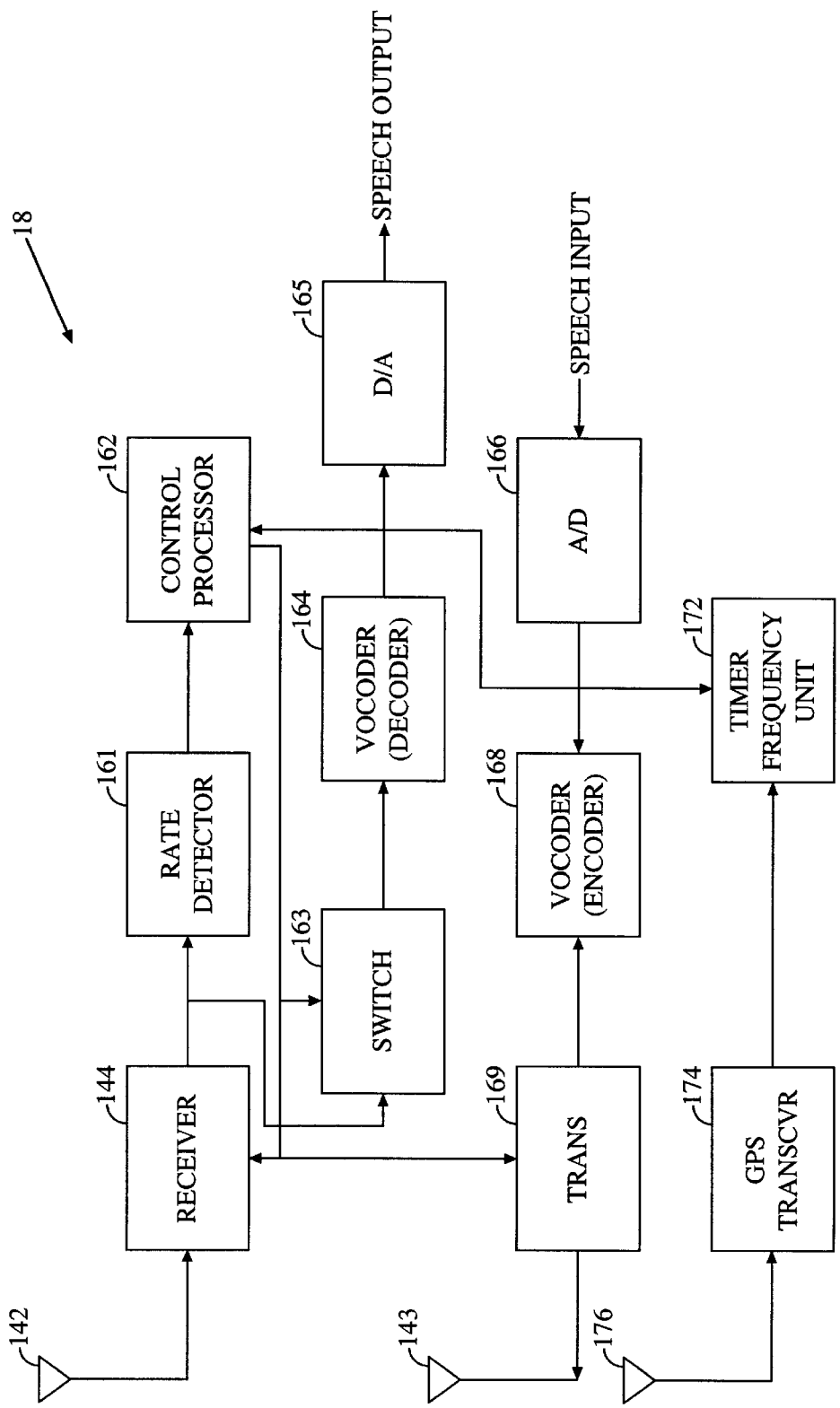
FIG. 7 is an illustrative simplified representation of a base station constructed in accordance with the teachings of the present invention.

FIG. 7 is an illustrative simplified representation of a base station 18 constructed in accordance with the teachings of the present invention. In accordance with the embodiment shown in FIG. 7, the base station 18 is essentially conventional. In an alternative embodiment, the base station 18 includes additional functionality which allows the base station to determine the position of a wireless unit 26, as will become clear from the description provided below. A conventional base station 18 includes a receive CDMA antenna 142 for receiving CDMA signals and a transmit CDMA antenna for transmitting CDMA signals. Signals received by the antenna 142 are routed to a receiver 144. In practice, the receiver 144 includes demodulators, deinterleavers, decoders and other circuits as will be appreciated by those skilled in the art. The received signal is allocated to an appropriate channel for which a rate detector 161 is associated. A control processor 162 uses the rate of the detected signal to detect speech. If speech is detected in a received frame, the control processor 162 switches the received frame to a vocoder 164 via a switch 163. The vocoder 164 decodes the variable rate encoded signal and provides a digitized output signal in response thereto. The digitized devocoded signal is converted to speech by a digital-to-analog converter 165 and an output device such as a speaker (not shown).

Input speech from a microphone or other input device (not shown) is digitized by an analog-to-digital converter 166 and vocoded by a vocoder encoder 168. The vocoded speech is input to a transmitter 169. In practice, the transmitter 169 includes modulators, interleavers and encoders as will be appreciated by those skilled in the art. The output of the transmitter 169 is fed to the transmit antenna 143.

Conventional base station 18 is also equipped with a GPS antenna 176, transceiver 174 and timing and frequency unit 172. The timing and frequency unit accepts signals from the GPS engine of the GPS receiver and uses them to generate timing and frequency references for the proper operation of the CDMA system. Accordingly, in many such CDMA systems, each cell site uses a GPS time base reference from which all time critical CDMA transmissions (including pilot sequences, frames and Walsh functions) are derived. Such conventional timing and frequency units and GPS engines are common in CDMA systems and are well known in the art. Conventional timing and frequency units provide frequency pulses and timing information. In contrast, the timing and frequency unit 172 of the present invention preferably also outputs the elevation angle, pseudo range, satellite identification (i.e., pseudo noise (PN) offset associated with each satellite) and the Doppler shift associated with each satellite in order to assist the wireless unit 26 in acquiring the satellites (i.e., decrease the amount of time required to acquire a satellite). This information is typically available within conventional timing and frequency units, but is typically neither needed nor provided to external devices. The additional information provided by the timing and frequency unit 172 is preferably communicated to the base station controller (BSC) (see 14 of FIGS. 1 and 2) in the same manner as is conventionally done with regard to frequency and timing information in a conventional base station.

Figure 8:
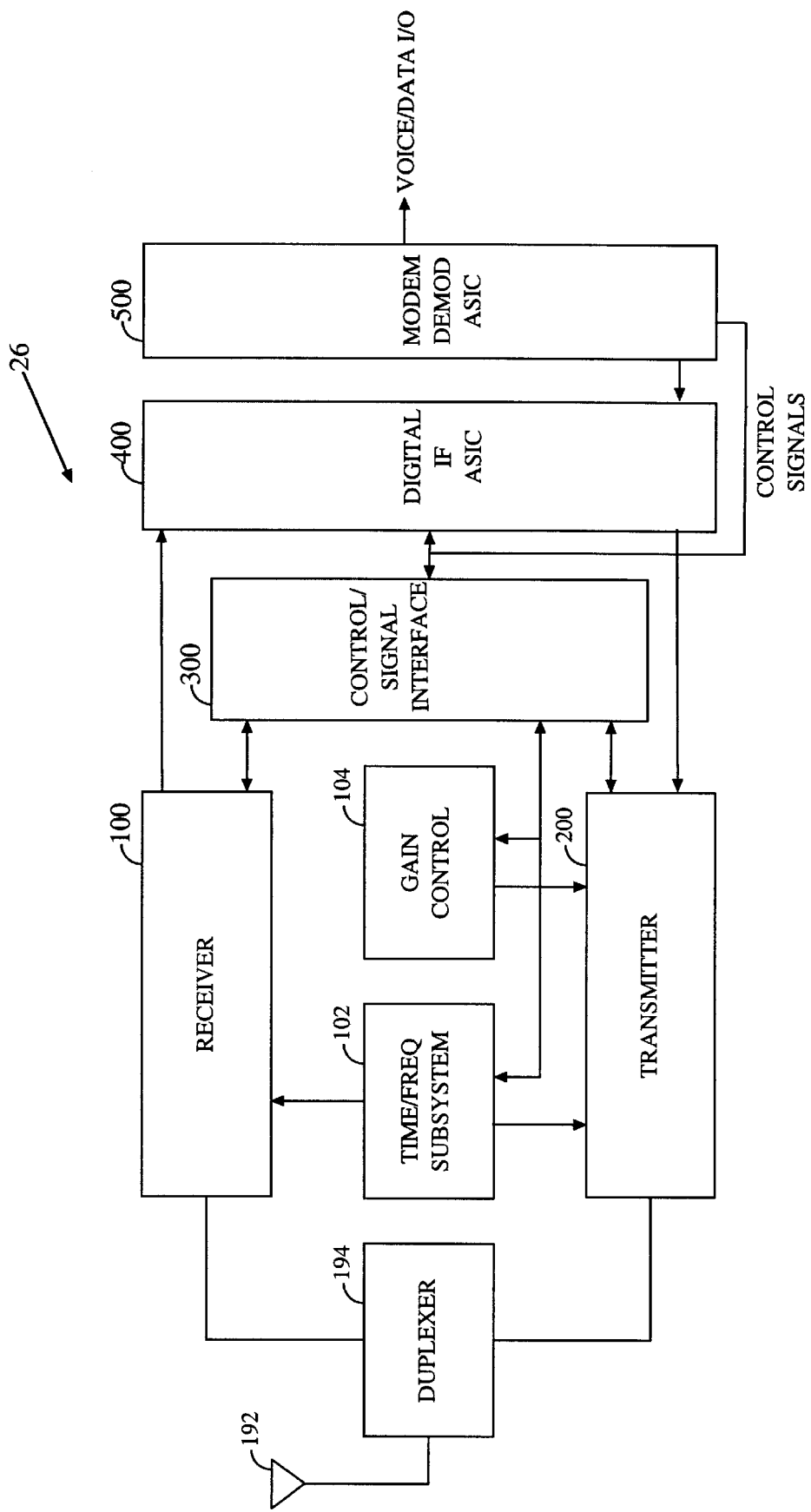
FIG. 8 is a block diagram of the wireless unit of the system for determining the position of a wireless CDMA transceiver of the present invention.

FIG. 8 is a block diagram of the wireless unit 26 in accordance with one embodiment of the present invention. The wireless unit 26 preferably includes a bi-directional antenna 192 adapted to receive CDMA transmissions well as GPS signals. In an alternative embodiment of the present invention, separate antennas may be used for receiving and transmitting GPS signals, CDMA signals, and other signals, such as alternative system signals. The antenna 192 preferably feeds a duplexer 194. The duplexer 194 preferably feeds a receiver 100 and is preferably fed by a transmitter 200. A time frequency subsystem 102 provides analog and digital reference signals for the receiver 100, a control signal interface 300, and the transmitter 200, as will be appreciated by those skilled in the art. A gain control circuit 104 provides CDMA power control.

In one embodiment of the present invention, the control signal interface 300 is a digital signal processor (DSP). Alternatively, the control signal interface may be another circuit capable of performing gain control functions. The control signal interface 300 provides control signals for the wireless unit 26. The receiver 100 provides for radio frequency (RF) down conversion and a first stage of intermediate frequency (IF) down conversion. A digital IF application specific integrated circuit (ASIC) 400 provides for a second stage of IF to baseband down conversion, sampling and A/D conversion. A mobile demodulator ASIC 500 searches and correlates digital baseband data from the digital IF ASIC 400 to ascertain pseudo-ranges as discussed more fully below.

The pseudo-ranges, along with any voice or data, is passed by the mobile demodulator 500 to the digital IF modulator 400. The digital IF modulator 400 provides a first stage IF up conversion of the data received from the mobile demodulator 500. A second stage of IF up conversion and RF up conversion of these signals is provided by the transmitter circuit 200. These signals are then transmitted to the base station 18 and processed in accordance with the method of the invention discussed below. It should be noted that location information to be communicated between the wireless unit 26 and the BSC 14, such as pseudo-ranges received by the wireless unit 26, are preferably communicated by the wireless unit 26 to the base station 18 via a data burst type message, such as short message service (SMS) defined by industry standard TIA/EIA/IS-637, published by the Telephone Industry Association. Such messages are transmitted through the base station 18 to the BSC 14. Alternatively, a newly defined burst type message could be transmitted by the wireless unit 26 to the base station 10.

Figure 9:
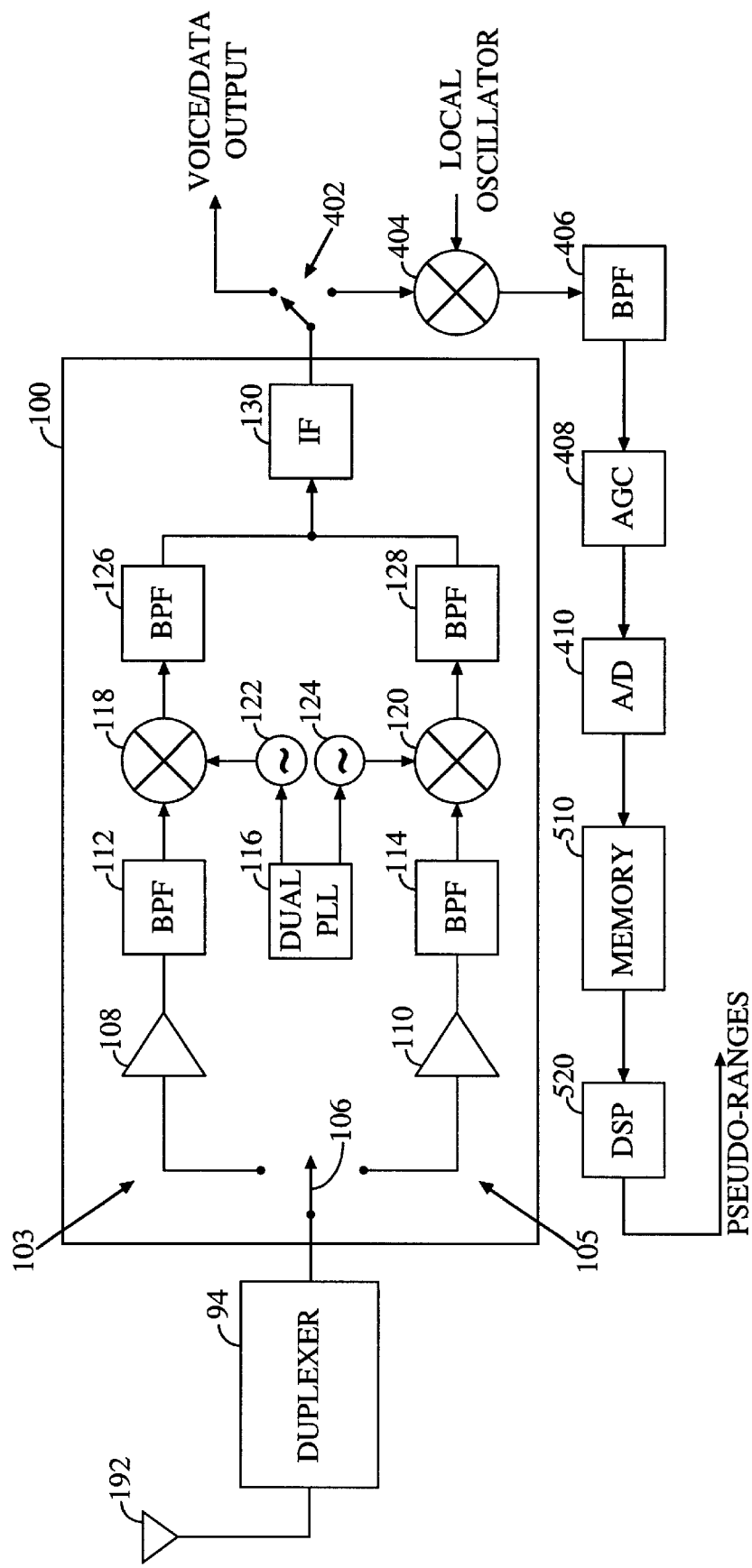
FIG. 9 is a block diagram of an illustrative implementation of a portion of the receiver, control signal interface, digital IF, and wireless demodulator circuits of the wireless unit of the present invention.

FIG. 9 is a block diagram of an illustrative implementation of a portion of the receiver, control signal interface, digital IF, and mobile demodulator circuits of the wireless unit 26 of the present invention. The transmitter portion of the wireless unit 26 is essentially identical to the transmitter portion of a conventional wireless unit and therefore is not discussed herein for the sake of brevity. In the preferred embodiment, the receiver 100 is implemented with first and second paths 103 and 105, respectively, which are connected to the antenna 192 via the duplexer 194 via a first switch 106. It will be understood by those skilled in the art that more integration between the two-way communication device and the GPS receiver could take place. Alternatively, two separate receivers with an appropriate interface could achieve the objective of the present invention.

The first path 103 downconverts received CDMA signals and provides conventional CDMA RF downconverted output signals. The first path 103 includes a low noise amplifier 108, a first bandpass filter 112, a first mixer 118 and a second bandpass filter 126. The second path 105 downconverts GPS signals from the GPS satellites 160,170,180 or 190 of FIG. 6. The second path 105 includes a second low noise amplifier 110, which feeds a third bandpass filter 114. The output of the bandpass filter 114 is input to a second mixer 120. The output of the second mixer 120 is fed to a fourth bandpass filter 128. The first and second mixers 118 and 120, respectively, are fed by first and second local oscillators 122 and 124, respectively. The first and second local oscillators 122 and 124 operate at different frequencies under control of a dual phase locked loop (PLL) 116. The dual PLL insures that each local oscillator 122 and 124 maintains a reference frequency effective to down convert either a received CDMA signal, in the case of the first mixer 118, or a received GPS signal, in the case of the second mixer 120. The outputs of the second and fourth bandpass filters 126 and 128 are coupled to a first IF section 130 of conventional design.

The output of the IF filter section 130 is input to a second switch 402 in the digital IF ASIC 400. The first and second switches 106 and 402 operate under control of the control signal interface 300 to divert a received signal for voice or data output processing in a conventional CDMA manner or GPS processing by a third mixer 404, fifth bandpass filter 406, an automatic gain control circuit 408 and an analog to digital converter 410. The second input to the third mixer 404 is a local oscillator output. The mixer 404 converts the applied signal to baseband. The filtered, gain controlled, signal is fed to an analog-to-digital converter ("A/D") 410. The output of the A/D 410 includes a first digital stream of in-phase (I) components and a second digital stream of quadrature components (Q). These digitized signals are fed to a digital signal processor 520, which processes the GPS signal and outputs the pseudo-range information required for position determination.

In an alternative embodiment of the present invention, the outputs from the two bandpass filters 126, 128 are fed to a baseband application specific integrated circuit (ASIC) which digitally converts the IF frequency signals output from the baseband filters 126, 128 to baseband and outputs a stream of digital values that represent the quadrature and in-phase baseband signals. These signals are then applied to a searcher. The searcher is essentially identical to conventional searches used in CDMA demodulators. However, the searcher that is preferably used is programmable to allow the searcher to search for either a PN code associated with the CDMA signals transmitted from the base station or the PN code associated with the GPS satellites. The searcher discriminates between CDMA channels when receiving CDMA signals from the base station and determines the GPS satellite from which received GPS signals are being transmitted when in the GPS mode. In addition, once the GPS signals are acquired, the searcher indicates the time offset associated with the PN code essentially in a conventional manner in order to determine the pseudo range associated with satellites from which signals are being received, as will be understood by those skilled in the art.

It will be understood by those skilled in the art that a double conversion process, such as is shown in FIG. 9, or alternatively, a single conversion and IF sampling technique, could be used to produce the required I and Q samples. Furthermore, the structure of the embodiment shown in FIG. 9 may be altered in many ways that would not affect the operation of the present invention. For example, a conventional programmable processor may be used in place of the DSP that is shown in FIG. 9. The memory 510 may not be required if the rate at which data flows through the system is such that no buffers are required. The bandpass filter 406 and automatic gain control circuit 408 may be omitted under certain conditions, implemented using digital techniques or analog techniques, or other wise altered. Many other such variations to the structure that is shown in FIG. 9 may be made without altering the invention. Furthermore, it should be noted that an alternative embodiment may have greater or lesser sharing of hardware and software resources between the GPS and wireless receiver.

Figure 10:
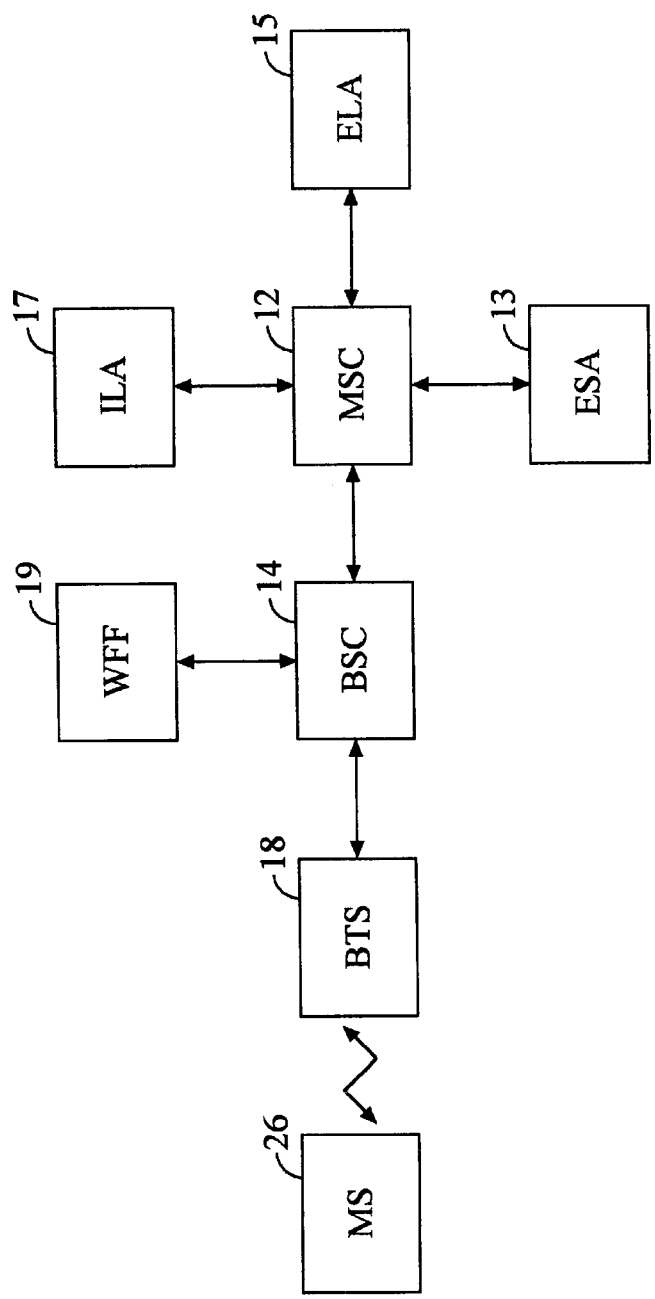
FIG. 10 is an illustration of a functional model for determining the location of a wireless unit.

FIG. 10 is a high-level block diagram of the components of a communication system, which includes the present invention. In operation, in accordance with the inventive method, the BSC 14 requests GPS information from the control processor 162 (FIG. 7) within the base station 10. This information includes, but is not limited to all of the satellites currently being viewed by the GPS transceiver 174 (FIG. 7), their elevation angle, Doppler shift, and pseudo ranges at a specific time. Note that the GPS receiver at the base station 18 has up-to-date information on the location, frequency, and PN offset of each satellite in view, because it is always tracking all satellites that are in view. Alternatively, the base station 18 could send data corresponding to a subset of only those satellites that can be viewed by the wireless unit 26, assuming that the base station 18 has stored information regarding the street width and height of the surrounding buildings. That is, if the base station 18 has the ability to determine that the wireless unit will have an obstructed view of one or more satellites, then the base station 18 will not send information regarding those satellites that are obstructed.

It should be noted that a conventional GPS receiver notes the time at which satellite signals are received with respect to the receiver's internal GPS clock. However, the receiver's internal GPS clock is not accurately synchronized to "true" GPS time. Therefore, the receiver cannot know the exact point in "true" GPS time at which the satellite signals are received. Later, a navigation algorithm corrects this error by using a fourth satellite. That is, if the dock within the receiver were accurately synchronized to the clock in each satellite, then a conventional GPS receiver would only require three satellites to accurately determine the position of the receiver. However, since the receiver clock is not accurately synchronized to the satellite's clock, additional information is required. This additional information is provided by noting the time at which a fourth satellite's signal is received by the receiver. This can be understood by noting that there are four equations (i.e., one equation associated with each of the four satellites) and four unknowns which must be solved (i.e., the x, y, and z coordinates of the receiver, and the error in the receiver clock). Therefore, for three-dimensional solutions, at least four measurements from four different satellites are required in a conventional GPS receiver.

In contrast, the present system utilizes an earth-based station, which is synchronized to true GPS time. In one embodiment, this station is a CDMA base station. It will be understood by those skilled in the art that CDMA base stations are synchronized to GPS time. In addition, all wireless units that communicate through such CDMA base stations using the CDMA protocol are also synchronized to an offset GPS time which is unique to each wireless unit 26. The offset in time is equal to the one-way delay caused by the propagation of the radio signal from the base station antenna to the wireless unit antenna. This is due to the fact that the wireless unit synchronizes its clock by receiving an indication from the base station of the GPS time. However, by the time the indication arrives at the wireless unit, the indication is in error by an amount equal to the propagation delay encountered while the signal travels from the base station to the wireless unit. This propagation delay can be determined by measuring how long it takes a signal to make a round-trip between the base station and the wireless unit. The one way delay will be equal to half the round trip delay. Many ways for measuring the round trip delay are available to those skilled in the art.

In addition, the distance between the base station 18 and the wireless unit 26 can be used to assist in determining the location of the wireless unit 26. Hence, in the case of direct line-of-sight (LOS) between the base station 18 and the wireless unit 26, one needs only two satellite range measurements and one base station range measurement. In cases where there is no direct LOS between the serving base station and the wireless unit, three satellite measurements and one round trip delay measurement are required to calculate a three-dimensional location. The extra satellite measurement is required to correct for the additional distance introduced by the additional delay caused by the multipath. The round trip delay is used to correct the clock error (bias) in the wireless unit.

The system described herein allows the position of a valid CDMA wireless unit to be determined at any time utilizing a Wireless Positioning Function (WPF) 19 (FIG. 10), as long as the wireless unit 26 is within the radio coverage area of the CDMA network and as long as there is sufficient quality of service on the CDMA network. The process of determining the position of a wireless unit may be initiated by the wireless unit 26, the network, or an external entity, such as an internal location application (ILA) 17, an external location application (ELA) 15, or an emergency service application (ESA) 13. Each of these components 13, 15, 17 may be either hardware or software which is capable of requesting and/or receiving location information. In one embodiment, the ILA 17 is a terminal coupled to the BSC 14 which allows an operator to directly request and receive location information regarding a wireless unit 26. Alternatively, the ILA 17 is a software application executed by a processor within the MSC 12.

The WPF 19 is preferably a conventional programmable processor capable of accepting the raw data that is received from the wireless unit and from the satellites (i.e., the pseudo ranges from two satellites, the distance from the wireless unit to the base station and the time correction factor) and calculating the position of the wireless unit. However, any device that is capable of receiving the information required to calculate the location of the wireless unit 26 based on such received information and output this location determination may be used. For example, the WPF 19 may be implemented as an ASIC, a discrete logic circuit, a state machine, or a software application within another network device (such as the BSC 14). Furthermore, it should be understood that the WPF 19 may be located within the base station 10, the BSC 14, or elsewhere in the MSC 12. Preferably, the WPF 19 is a software application that is either executed by a dedicated processor that is in communication with the BSC 14. Accordingly, the base station 10, the BSC 14, and the MSC 12 need not be significantly modified in order to implement the present invention with conventional components. Alternatively, the WPF 19 is a software application that is executed by a processor within the BSC 14. The WPF 19 preferably communicates with the BSC 14 via a communication port similar to that used by conventional billing functions, management functions, home location register/visitor location register functions, and other ancillary functions that are performed by processors that are coupled to conventional BSCs.

The algorithm used to calculate the position is provided in Parkinson, B. W., and Spilker, J. J., Editors, Global Positioning System: Theory and Applications, Volume. I, American Institute of Aeronautics and Astronautics Inc., Washington D.C., 1996. Additionally, it should be noted that Volume II teaches how to perform differential GPS correction. It will be understood by those skilled in the art that such correction may have to be performed by the WPF 19 in order to calculate the position of the wireless unit accurately.

In accordance with one embodiment of the present invention, a service provider can restrict positioning services based on several conditions, such as capability, security, service profiles, etc. Location services may support each, or some subset, of the following services:

(1) Wireless unit originated request for positioning (WPF).

(2) Network originated request for positioning (NRP).

(3) Positioning allowed on a per service instance (PSI): The wireless unit gives an external application a temporary allowance to position the unit for the purpose of delivering a specific service.

(4) Positioning with/without wireless unit identification (PWI/PWO): will position all wireless units in a defined geographical area. PWI will give the identity and the location of these units while PWO will only give their location.

(5) Positioning within a closed group (PCG): Allows for the creation of groups within which special rights for positioning can be determined (fleet management).

TABLE 1

Type of location services

| Initiator\Periodicity | On demand (single/multiple instances) | Periodically | Event trigger |
|---|---|---|---|
| Wireless unit | WPF, PSI, PCG | WPF, PCG | WPF |
| Network | PWO | PWO | NRP/PWO |
| External | PWO, PWI, PCG, PSI | PWO, PWI, PCG | |

Figure 11:
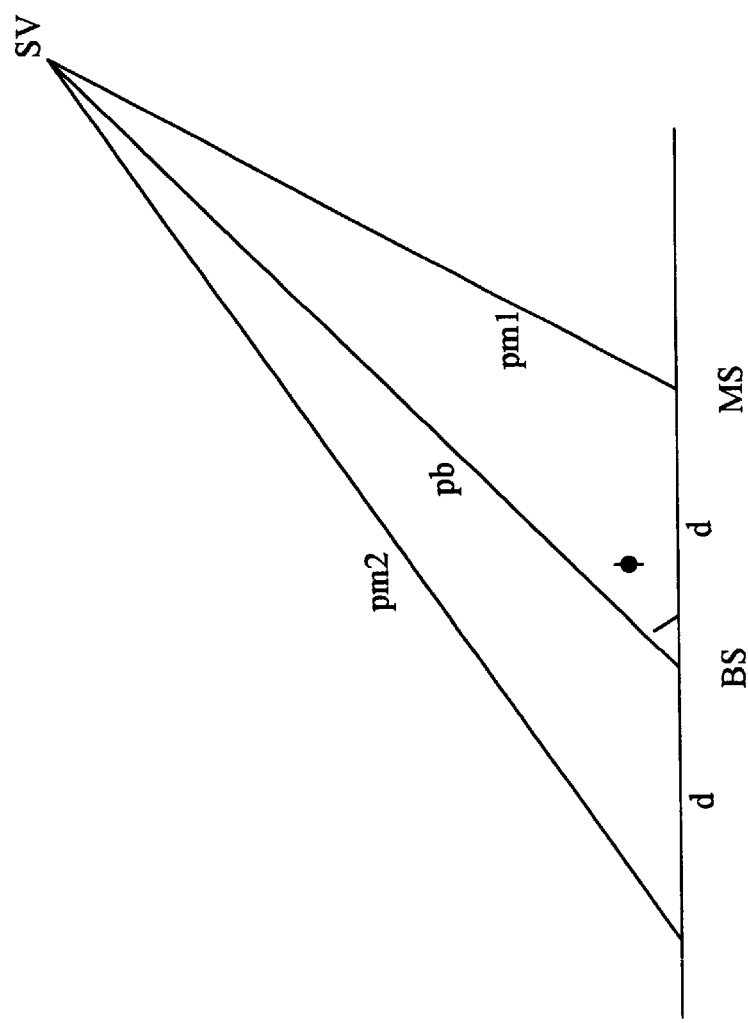
FIG. 11 shows the calculations of the search window size and center in the time domain.

In accordance with one embodiment of the present invention in which a wireless unit 26 originates a request for the position of that wireless unit 26 to be determined, the wireless unit 26 sends a position request to the MSC 12. The MSC 12 validates the request to ensure that the wireless unit 26 has subscribed to the type of service requested. The MSC 12 then sends a request to the serving BSC 14 to find the position of the wireless unit 26. The BSC 14 asks the serving base station 18 for position aiding information. The serving base station 26 responds to the request by sending a list of satellites in view, their Doppler shift, their rate of Doppler change, their pseudo-ranges, their elevation angles, their Signal-to-Noise ratio (SNR), and the Round Trip Delay (RTD) between the wireless unit and the serving base station. Note that the GPS receiver 174 within the base station 18 is continuously tracking the satellites in view and hence can have up-to-date information on these parameters. The BSC 14 will use the RTD, pseudo-range, satellite elevation angle, Doppler shift and rate of change of Doppler for each satellite to calculate the search window center and search window size in both time and frequency as follows (see also FIG. 11):

In the time domain the center of the search window for the $i^{th}$ space vehicle ("$SV_i$") is equal to the pseudo-range between the serving base station 18 and the $SV_i$, _b in FIG. 11. The search window size for $SV_i$ is equal to the round trip delay times the cos (_i), where cos (_i) is the cosine of the angle of the elevation of the satellite with respect to the radius of the earth which originates at the center of the earth and passes through the receiver.

In frequency domain, the center of the search window center for $SV_i$ is equal to $f_o+f_{di}$; where $f_o$ is equal to the carrier frequency of the GPS signal and $f_{di}$ is equal to the Doppler shift of the signal transmitted by $SV_i$. The search window size for $SV_i$ is equal to the uncertainty in frequency due to receiver frequency error and Doppler rate of change. The BSC 14 sends the information including satellites in view, searcher window centers, sizes, in both time and frequency, and the minimum number of satellites needed to determine the position of the wireless unit 26.

In accordance with one embodiment, a message to the wireless unit 26 will trigger a re-tuning signal at the wireless unit 26. The message also could have an "action time" (a particular time in the future when the receiver will retune to a GPS receiver frequency). In response, the wireless unit 26 will activate the first and second switches 106 and 402 at the action time (FIG. 9) and thereby retune itself to the GPS frequency. The digital IF ASIC 400 changes its PN generator (not shown) to GPS mode and starts to search all specified satellites.

Once the wireless unit 26 acquires the minimum number of the required satellites, it computes the pseudo-ranges based on the GPS clock within the wireless unit 26, re-tunes to the communication system frequency, and sends the pseudo-range results along with the measured signal-to-noise ratio of the first three satellites and a most recent CDMA pilot search result to the BSC 14. The pilots search results are needed if the unit cannot acquire three satellites and there is no direct line of sight path between the serving base station and the wireless unit 26. Nonetheless, less than three satellites can be used, as long the round trip delay from another device, such as another base station, can be computed using available information, such as pilots search information. Techniques for determining round trip delay based on pilot search information are well known in the art.

Figure 12:
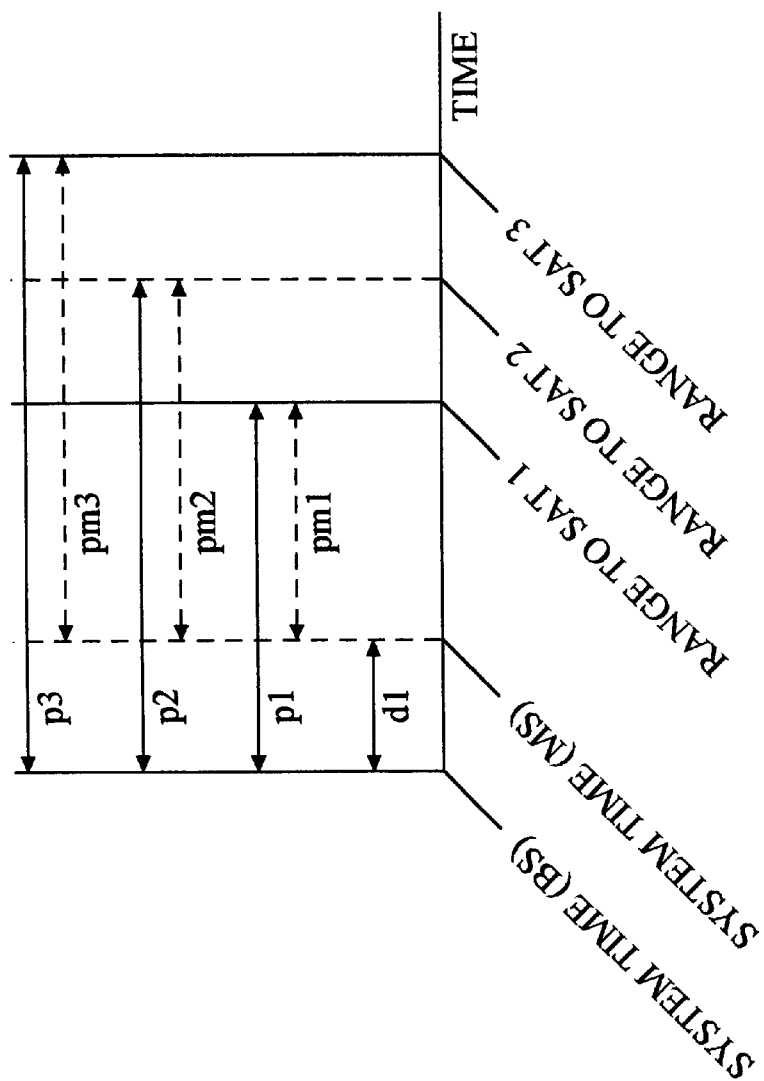
FIG. 12 is a diagram, which illustrates correction of the local clock bias.

The BSC 14 sends the pseudo-range measurements made by the wireless unit 26, together with the position of the serving base station 10, the corresponding round trip delay measurements, the position (in space) of the satellites under consideration (with reference to a fixed, predetermined reference origin), and differential GPS correction to the WPF 19 where the position of the wireless unit 26 is calculated. The pseudo-ranges received from the wireless unit 26 by the BSC 14 and passed to the WPF 19 are relative to the clock within the wireless unit 26. Therefore, they are erroneous (i.e., biased by the round trip delay between the serving base station (BTS) 18 and the wireless unit 26). FIG. 12 is a diagram, which illustrates how the WPF 19 corrects for the local clock bias. In FIG. 12, _1 represents the pseudo-range (half the round trip delay) in the receipt of signals transmitted from the base station 18 to the wireless unit 26 and vice versa, rm1, rm2 and rm3 are the pseudo-ranges from the wireless unit to the first, second and third selected GPS satellites 160, 170 and 180, respectively. These measurements are taken with respect to the local clock in the wireless unit 26. But since the local clock is offset from the true GPS time by _1, the corrected pseudo-ranges are then:

$$\_1 = \_m1 + \_1$$

$$\_2 = \_m2 + \_1$$

$$\_3 = \_m3 + \_1$$

The WPF 19 uses the above three equation, position (in space) of the three satellites, position of the severing base station, and corresponding RTD measurements to calculate the position of the wireless unit 26. Note that knowing the RTD is equivalent to exactly knowing the local clock bias of the wireless unit relative to the true GPS time. That is, it is sufficient to solve the three range equations from the three satellites.

Note also that the minimum number of satellites required can be reduced to two if there is a direct line of sight connection between the wireless unit 26 and a base station 10, such that the distance between the wireless unit 26 and the base station 18 can be determined directly from the RTD between the wireless unit 26 and the base station 10. This number can be further reduced if information about other pilots (sites) are available. For example, if the wireless unit 26 is in communication with two or more base stations (e.g., soft handoff), neither of which have a direct line of site to the wireless unit 26, more than one round trip delay may be calculated, and hence two satellites are all that is needed to determine the position of the wireless unit 26. That is, the calculations can be made based on the five equations (two equations related to the two pseudo range measurements associated with the two satellites, two equations related to the two base station RTD measurements, and one equation related to the RTD to the serving base station that allows the local clock within the wireless unit 26 to be synchronized to true GPS time). This is very useful in scenarios where GPS satellites are blocked or shadowed by buildings or trees. In addition, it reduces the time to search for GPS satellites. The WPF 19 sends the calculated position to BSC 14, which forwards it to MSC 12 or sends it directly to the wireless unit 26.

Figure 13:
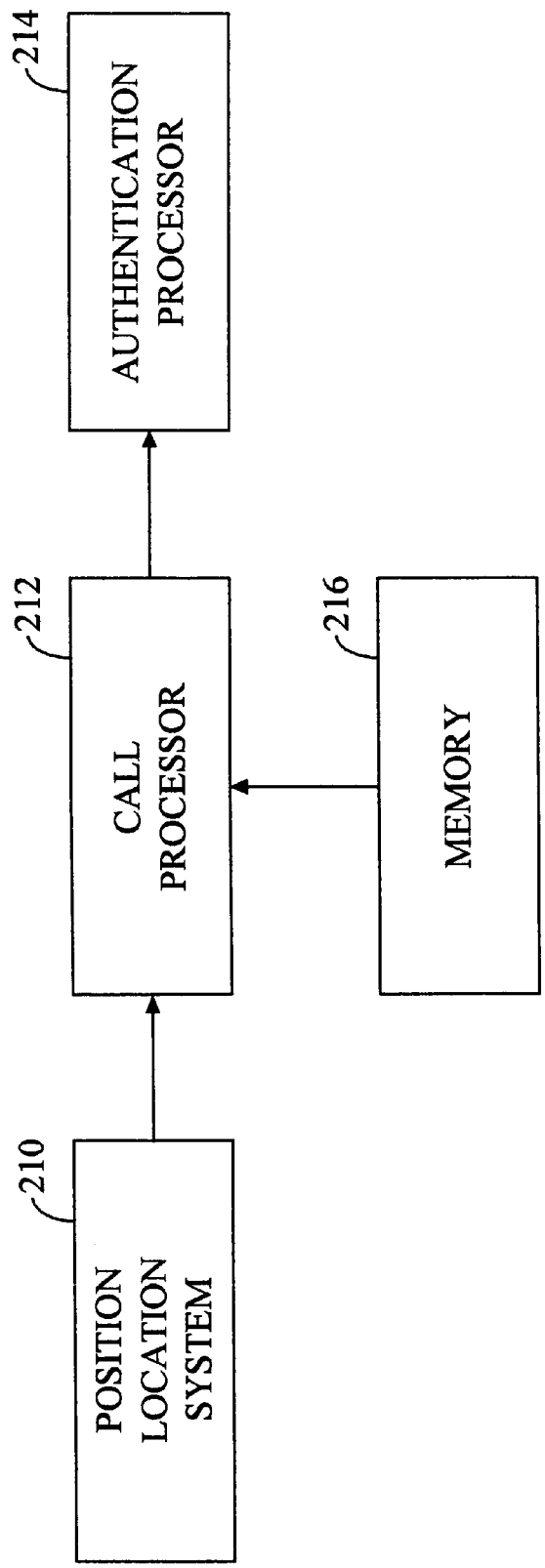
FIG. 13 is a simplified block diagram of one embodiment of the present invention.
Figure 14:
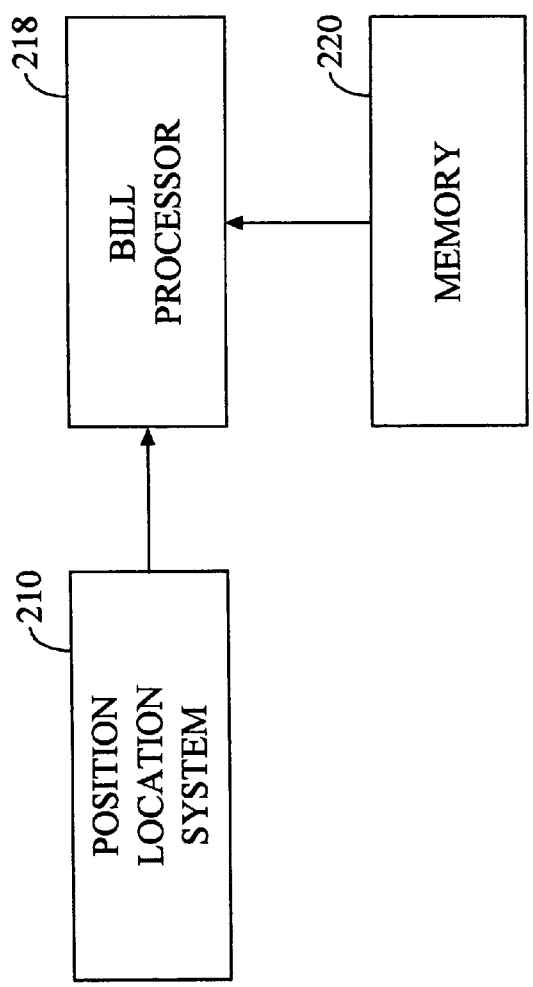
FIG. 14 is a simplified block diagram of another embodiment of the present invention.

In accordance with another embodiment, position location can be used to deter a terminal, such as fixed wireless telephone (e.g., a wireless local loop telephone, a data modem, a computer with a wireless telephone modem, or any other such wireless communication device capable of communicating on the system), from being moved. In accordance with one such embodiment, illustrated in FIG. 13, if the terminal is moved more than a few hundred feet, a call processor 212 within the MS 26, the BTS 18, the BSC 14, or the MSC 12 will not process calls to or from the telephone. The call processor 212 may be any general purpose computer which is capable of receiving an initial position location from a memory 216, comparing the initial position location with the current location of the terminal as determined by a position location system 210, determining the distance between the current location and the initial position location, determining whether the distance is within a predetermined stored distance, and indicating to a conventional authentication processor 214 that the terminal is not sufficiently close to the initial position location. The authentication processor 214 then determines that the terminal is not authorized to make the call. The authentication processor 214 may be any general purpose processor that is capable of receiving information from the call processor 212 and preventing a call from being completed. Authentication processors are well known in the art, and are commonly used to ensure that the caller is a registered system user for billing purposes. In one such embodiment, this process occurs prior to authorizing the call. In another embodiment, the call processor 212 monitors the location of the terminal to ensure that the terminal is not moved more than the predetermined distance from the initial position location. This is very useful in systems in which the service provider has a billing structure in which a customer pays less for fixed service than for mobile service.

In another embodiment, a service provider may desire to charge different rates for customers at different locations within the system. The current scheme may be used to supplement other billing information in order to provide a bill in which charges are determined based upon the position of a terminal within the system, as well as time of day, day of the week, etc. Accordingly, the position location system 210 used to determine the location of the terminal is coupled to a billing processor 218. The billing processor 218 receives information from the position location system 210 regarding the location of the terminal. In addition, the billing processor 218 receives information from a memory 220 which is used to determine the billing rate based on the location of a terminal. The billing processor 218 then determines the rate at which the communication services will be billed based upon the location of the terminal using the information provided from the memory 220 and the position information provided by the position location system.

The present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for facilitating handoff in a telecommunications system or between telecommunications systems comprising;

a) position means for determining the location of a mobile transceiver within a region containing a first cell and a second cell;

b) comparison means for comparing said location with a predetermined handoff area within said region and providing a control signal in response thereto;

c) handoff initiation means for initiating handoff of said mobile transceiver between said first cell and said second cell in response to said control signal; and d) means for initiating said comparison means when said mobile transceiver is within a predetermined range of said predetermined handoff area and providing a tracking signal in response thereto.

2. The invention of claim 1 wherein said handoff initiation means includes first means for implementing handoff of said mobile transceiver from said first cell to said second cell when said mobile transceiver moves from within said first cell into said predetermined handoff area as determined by said handoff initiation means via said tracking signal.

3. The invention of claim 1 wherein said handoff initiation means includes second means for implementing handoff of said mobile transceiver from said second cell to said first cell when said mobile transceiver moves from within said second cell to said predetermined handoff area as determined by said handoff initiation means via said tracking signal.

4. The invention of claim 1 wherein said means for initiating includes pilot offsets transmitted via said first or second cell and received by said means for tracking.

5. The invention of claim 1 wherein said tracking signal is said control signal when said mobile transceiver is within said predetermined handoff area.

* * * * *